(12) United States Patent
Sugiyama

(10) Patent No.: US 8,219,718 B2
(45) Date of Patent: Jul. 10, 2012

(54) ELECTRONIC APPARATUS, INFORMATION OUTPUT METHOD AND PROGRAM

(75) Inventor: Minoru Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 250 days.

(21) Appl. No.: 12/668,680

(22) PCT Filed: Jul. 4, 2008

(86) PCT No.: PCT/JP2008/062218
§ 371 (c)(1),
(2), (4) Date: Jan. 12, 2010

(87) PCT Pub. No.: WO2009/008382
PCT Pub. Date: Jan. 15, 2009

(65) Prior Publication Data
US 2010/0191953 A1    Jul. 29, 2010

(30) Foreign Application Priority Data
Jul. 12, 2007  (JP) ................................ 2007-182970

(51) Int. Cl.
*G06F 3/00* (2006.01)
*G06F 13/00* (2006.01)
(52) U.S. Cl. ..................... 710/8; 710/5; 710/14; 710/15
(58) Field of Classification Search ........................ None
See application file for complete search history.

(56) References Cited

U.S. PATENT DOCUMENTS

2006/0234764 A1* 10/2006 Gamo et al. ............... 455/552.1
2007/0142093 A1*  6/2007 Mikuni et al. ................ 455/566

FOREIGN PATENT DOCUMENTS

| JP | H11-136761 A | 5/1999 |
| JP | H11-242411 A | 9/1999 |
| JP | 2006-120087 A | 5/2006 |
| JP | 2007-011489 A | 1/2007 |

OTHER PUBLICATIONS

International Search Report for PCT/JP2008/062218 mailed Aug. 5, 2008.

* cited by examiner

*Primary Examiner* — Scott Sun

(57) ABSTRACT

An electronic apparatus (10) has a plurality of functions. A key code recognizing unit (13) recognizes an input of a key code for requesting setting of a parameter about a setting particular related to each function. A storage unit (17) stores handling information (172) for handling setting restriction, for each setting particular whose parameter is restricted from being set in relation to other setting particulars. When the key code recognizing unit (13) recognizes an input of a key code for requesting setting of a parameter, a guidance process unit (15) determines whether setting of the parameter is restricted or not. If setting of the parameter is restricted, the guidance process unit (15) reads out handling information (172) for handling the setting restriction from the storage unit (17) and outputs it to a window control unit (14). The window control unit (14) displays the handling information (172) on a display unit (16).

18 Claims, 15 Drawing Sheets

FIG. 2A

| OPERATION PROCEDURE | CATEGORIES ① | CATEGORIES ② | CATEGORIES ③ | FUNCTION EXPLANATION | USAGE RESTRICTION/ADVISORY/ SUPPLEMENTARY REMARKS | HANDLING |
|---|---|---|---|---|---|---|
| M4 | <CAMERA> | GENERAL | HARD | | PHOTOS MIGHT BE VAGUE IF CAMERA LENS IS STAINED WITH FINGERPRINT OR GREASE. WIPE OFF STAIN WITH SOFT CLOTH. | — |
| | | GENERAL | HARD | | CHANGE CLOSEUP SWITCH ON CAMERA SIDE TO USE CLOSEUP MODE (APPROX. 10cm) OR NORMAL MODE. | — |
| | | AT THE TIME OF SHOOTING | SPECIFICATIONS | YOU CAN TAKE PHOTO (STILL PICTURE) BY BUILT-IN 2-MILLION-PIXEL CAMERA SCREEN. | | — |
| | | AT THE TIME OF SHOOTING | SPECIFICATIONS | | SHUTTER SOUND AND SELF-TIMER SOUND WILL BE PRODUCED WITH CERTAIN SOUND VOLUME EVEN IN MANNER MODE. | |
| | | GENERAL | SETTING | | SHOOTING WILL BE INTERRUPTED WHEN CALL IS RECEIVED DURING SHOOTING. | DISPLAY POP-UP MESSAGE WHEN CALL IS RECEIVED. |
| | | GENERAL | SETTING | | STORAGE LOCATION FOR TAKEN PHOTOS CAN BE SET IN BUILT-IN MEMORY OR MEMORY CARD BY AUTOMATIC STORAGE SETTING. | DISPLAY OPTION FOR CHANGING WINDOW TO STORAGE LOCATION SETTING WINDOW "M4M6". |
| | | AT THE TIME OF SHOOTING | SETTING | | YOU CAN CHANGE SHUTTER SOUND PATTERN FOR STILL PICTURE SHOOTING.(SEE M4M5) | AUTOMATICALLY CHANGE TO SHUTTER SOUND SETTING WINDOW "M4M5" WHEN CHANGE IS SELECTED. |

FIG. 2B

| OPERATION PROCEDURE | CATEGORIES ① | CATEGORIES ② | CATEGORIES ③ | FUNCTION EXPLANATION | USAGE RESTRICTION/ADVISORY/ SUPPLEMENTARY REMARKS | HANDLING |
|---|---|---|---|---|---|---|
| M4M | | GENERAL | SPECIFICATIONS | YOU CAN SET IMAGE QUALITY, IMAGE SIZE, SELF-TIMER SETTING, NIGHTMODE SETTING, ETC. | — | — |
| | <CAMERA> — <SETTING> | <IMAGE QUALITY SETTING> | SETTING | YOU CAN SELECT IMAGE QUALITY FOR SHOOTING FROM THREE OPTIONS OF FINE, NORMAL, AND ECONOMY. | WHEN FINE IS SET, YOU CANNOT SET UXGA SETTING IN COMBINATION. | — |
| | | <SIZE SETTING> | SETTING | YOU CAN SELECT IMAGE SIZE FOR SHOOTING FROM UXGA, SXGA, AND VGA. | WHEN UXGA IS SET, YOU CANNOT SET FINE SETTING IN COMBINATION. | — |
| | | <······> | ··· | | ······ | ······ |

FIG. 2C

| OPERATION PROCEDURE | CATEGORIES | | | FUNCTION EXPLANATION | USAGE RESTRICTION/ ADVISORY/ SUPPLEMENTARY REMARKS | HANDLING |
|---|---|---|---|---|---|---|
| | ① | ② | ③ | | | |
| M4M1 <CAMERA> - <SETTING> - <IMAGE QUALITY> | | <IMAGE QUALITY SETTING> | SPECIFICATIONS | YOU CAN SELECT IMAGE QUALITY FOR SHOOTING FROM THREE OPTIONS OF FINE, NORMAL, AND ECONOMY. | | — |
| | | <FINE> | SETTING | HIGH IMAGE QUALITY | WHEN FINE IS SET, YOU CANNOT SET UXGA SETTING IN COMBINATION. UXGA IS GRAYED-OUT. | THIS HANDLING IS BASED ON "FINE-UXGA" IN SUPPORT MANAGEMENT LIST. |
| | | <NORMAL> | SETTING | STANDARD IMAGE QUALITY | — | — |
| | | <ECONOMY> | SETTING | — | — | — |

FIG. 2D

| OPERATION PROCEDURE | CATEGORIES ① | ② | ③ | FUNCTION EXPLANATION | USAGE RESTRICTION/ ADVISORY/ SUPPLEMENTARY REMARKS | HANDLING |
|---|---|---|---|---|---|---|
| M4M2 | <CAMERA> — <SETTING> — <SIZE> | <SIZE SETTING> | SPECIFICATIONS | YOU CAN SELECT IMAGE SIZE FOR SHOOTING FROM UXGA, SXGA, AND VGA. | — | — |
| | | <UXGA> | SETTING | 1600X1200 | YOU CANNOT USE ZOOM IN/ZOOM OUT. | — |
| | | | SETTING | | WHEN FINE IS SET, YOU CANNOT SET UXGA SETTING IN COMBINATION. UXGA IS GRAYED-OUT. | THIS HANDLING IS BASED ON "FINE-UXGA" IN SUPPORT MANAGEMENT LIST. |
| | | <SXGA> | SETTING | 1280X960 | — | — |
| | | <VGA> | SETTING | 640X480 | — | — |

FIG. 6

| OPERATION PROCEDURE | SETTING PARTICULAR | RESTRICTION TARGET | USAGE RESTRICTION EXPLANATION | USAGE RESTRICTION | | |
|---|---|---|---|---|---|---|
| | | | | NECESSITY DETERMINATION WINDOW | PRIORITY ORDER | HANDLING |
| M4M1 | IMAGE QUALITY SETTING | FINE | | M4M1 | ① | [USAGE RESTRICTION] DISPLAY MESSAGE ●WHEN IMAGE QUALITY SETTING "FINE" IS SELECTED, DISPLAY THAT "SIZE UXGA CANNOT BE SET. DO YOU CHANGE SETTING? [YES] OR [NO]". ◆PROCSS FOR WHEN [YES] IS SELECTED: ・GRAY-OUT DISPLAY OF SIZE SETTING "UXGA". ・WHEN SIZE SETTING "UXGA" IS SELECTED, CHANGE SIZE SETTING TO "SXGA". ・DISPLAY MESSAGE THAT "UXGA IS GRAYED-OUT BECAUSE UXGA CANNOT BE SELECTED WHEN IMAGE QUALITY SETTING 'FINE' IS SELECTED. SXGA IS PROVISIONALLY SET. DO YOU AGREE? [YES] OR [NO]" WHEN [YES] IS SELECTED, REGISTER DATA ABOUT SETTINGS AND AUTOMATICALLY CHANGE TO IMAGE QUALITY SETTING WINDOW ON WHICH "FINE" IS SET. WHEN [NO] IS SELECTED, AUTOMATICALLY CHANGE TO IMAGE QUALITY SETTING WINDOW BEFORE "FINE" IS SET. ◆PROCESS FOR WHEN [NO] IS SELECTED: AUTOMATICALLY CHANGE TO WINDOW BEFORE IMAGE QUALITY SETTING "FINE" IS SET. |
| M4M2 | SIZE SETTING | UXGA | WHEN FINE IS SET, UXGA SETTING CANNOT BE SELECTED. | M4M2 | ② | |

30 IMAGE QUALITY SETTING SUPPORT PROCESS WINDOW

31 SIZE SETTING SUPPORT PROCESS WINDOW

ELECTRONIC APPARATUS, INFORMATION OUTPUT METHOD AND PROGRAM

The present application is the National Phase of PCT/JP2008/062218 filed on Jul. 4, 2008, which is based on Japanese Patent Application No. 2007-182970 filed on Jul. 12, 2007, of which specification, claims, and drawings are incorporated herein by reference in their entirety.

TECHNICAL FIELD

The present invention relates to an electronic apparatus, an information output method, and a program.

BACKGROUND ART

Electronic apparatuses with multiple functions are complicated to operate. For example, portable phones have a telephone function, an e-mail sending/receiving function, a camera function, a music play function, a Bluetooth function, a digital terrestrial television receiving function, etc. Such portable phones are very convenient tools, but have many particulars to set about each function.

When using such an electronic apparatus with multiple functions, it is desired that users be able to consult, as needed, all-round explanation about each function from a brief explanation to a detailed explanation, including general description, usage advisory, supplemental remarks, explanation about usage restrictions, etc.

Patent Literature 1 discloses a mobile communication terminal apparatus that has an operation guidance displaying function that displays operation guidance about a plurality of functions on a display unit. This mobile communication terminal apparatus includes a function restriction table that registers whether or not to restrict operation of each function. By referring to the function restriction table, this mobile communication terminal apparatus displays the image of operation guidance about a function that is restricted from being operated grayed out.

Patent Literature 2 discloses a portable information terminal apparatus that retrieves operation guidance information from a guidance table when a specific key is pressed, and displays the operation guidance on a display unit.

Patent Literature 1: Unexamined Japanese Patent Application KOKAI Publication No. H11-136761

Patent Literature 2: Unexamined Japanese Patent Application KOKAI Publication No. 2007-11489

DISCLOSURE OF INVENTION

Problem to be Solved by the Invention

With the mobile communication terminal apparatus disclosed in the above-identified Patent Literature 1, users cannot know by what restriction the display of operation guidance is grayed out. Furthermore, users cannot know whether or not there exist setting particulars about functions that are not grayed out, and if there exist some, what kind of restrictions such setting particulars have. Therefore, users have to consult an instruction manual if they want to know setting particulars or restrictions about the setting particulars. However, it is bothersome to carry around an instruction manual or read it. Hence, users might give up using the functions provided on their apparatus.

With the portable information terminal apparatus disclosed in the above-identified Patent Literature 2, users can give operations based on the display of operation guidance. However, when usage of a function is restricted, users have to read the instruction manual if they want to know how to cancel the restriction.

Further, users have to change each individual setting on a corresponding operation window in accordance with the restriction canceling method that is known by reading the instruction manual. Furthermore, in some case, users have to change a plurality of settings on a plurality of operation windows in order to cancel a restriction.

The present invention was made in view of the above circumstances, and an object of the present invention is to provide an electronic apparatus, an information output method, and a program that guide a user to appropriately set a setting particular that has a setting restriction.

Means for Solving the Problem

An electronic apparatus according to the configuration of the present invention is an electronic apparatus having a plurality of functions, and includes:

setting request detecting unit that detects that a request for setting a parameter about a setting particular related to each of the functions is given;

handling information storing unit that stores handling information for handling restriction against setting a parameter, for each setting particular that has a parameter that is restricted from being set in relation to another setting particular; and handling information processing unit that, in response to that the setting request detecting unit detects a request for setting a parameter, determines whether setting of the parameter is restricted or not, and in a case where setting of the parameter is restricted, outputs the handling information for handling restriction against setting.

An information output method according to the configuration of the present invention is an information output method of an electronic apparatus having a plurality of functions, and includes:

a handling information storing step of storing handling information for handling restriction against setting a parameter, for each setting particular that is related to any of the functions and that has a parameter that is restricted from being set in relation to a setting particular related to any other of the functions;

a setting request detecting step of detecting that a request for setting a parameter about a setting particular related to any of the functions is given; and a handling information processing step of, in response to that a request for setting a parameter is detected at the setting request detecting step, determining whether setting of the parameter is restricted or not, and in a case where setting of the parameter is restricted, outputting the handling information for handling restriction against setting.

A program according to the configuration of the present invention controls a computer having a plurality of functions to perform:

a handling information storing procedure of storing handling information for handling restriction against setting a parameter, for each setting particular that is related to any of the functions and that has a parameter that is restricted from being set in relation to a setting particular related to any other of the functions;

a setting request detecting procedure of detecting that a request for setting a parameter about a setting particular related to any of the functions is given; and a handling information processing procedure of, in response to that a request for setting a parameter is detected in the setting request detecting procedure, determining whether setting of the parameter is restricted or not, and in a case where setting of the parameter is restricted, outputting the handling information for handling restriction against setting.

Effect of the Invention

According to the present invention, it is possible to provide an electronic apparatus, an information output method, and a program that guide a user to appropriately set a setting particular that has a setting restriction.

BRIEF DESCRIPTION OF DRAWINGS

FIG. 2A is a diagram showing an example of guidance information stored in a storage unit.

FIG. 2B is a diagram showing an example of guidance information stored in the storage unit.

FIG. 2C is a diagram showing an example of guidance information stored in the storage unit.

FIG. 2D is a diagram showing an example of guidance information stored in the storage unit.

FIG. 6 is a diagram showing an example of handling information stored in the storage unit.

Figure 1:
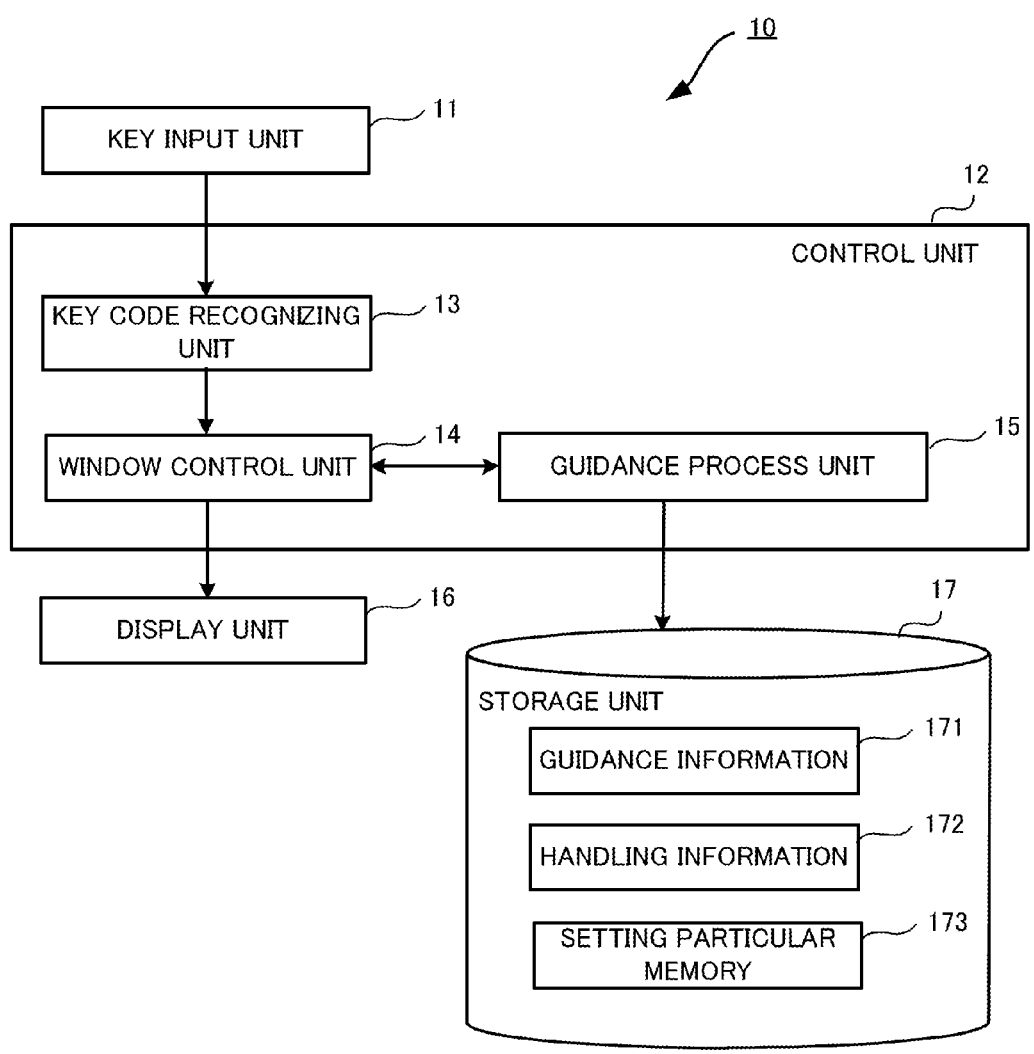
FIG. 1 is a block diagram showing an example of an electronic apparatus according to one embodiment of the present invention.

EXPLANATION OF REFERENCE NUMERALS 10, 100 electronic apparatus
11 key input unit
12 control unit
13 key code recognizing unit
14 window control unit
15 guidance process unit
16 display unit
17 storage unit
20 camera shooting window
21 camera shooting guidance window
22 camera setting window
23 camera setting guidance window
24, 32 image quality setting window
25 image quality setting guidance window
30 image quality setting support process window
30a image quality setting display area
30b support display area
31 size setting support process window
31a size setting display area
31b support display area
120 control unit
140 window control unit
150 support process unit
170 storage unit
171 guidance information
172 handling information
173 setting particular memory

BEST MODE FOR CARRYING OUT THE INVENTION

An electronic apparatus according to one embodiment of the present invention will be explained with reference to the drawings.

FIG. 1 is a block diagram showing an example electronic apparatus according to one embodiment of the present invention. As shown in FIG. 1, an electronic apparatus 10 includes a key input unit 11, a control unit 12, a display unit 16, and a storage unit 17.

The control unit 12 includes, for example, a Central Processing Unit (CPU), and various memories such as a Random Access Memory (RAM), a Read Only Memory (ROM), a flash memory, etc. The CPU of the control unit 12 realizes processes of a key code recognizing unit 13, a window control unit 14, and a guidance process unit 15 by, for example, executing a program stored in the memory.

The storage unit 17 includes, for example, a flash memory and a hard disk. The storage unit 17 stores guidance information 171, handling information 172, and a setting particular memory 173, which are to be described later.

The key input unit 11 includes various keys. A user enters key input information by operating keys on the key input unit 11. The key code recognizing unit 13 recognizes key input information entered via the key input unit 11 and determines the kind of the key entered by the user.

The window control unit 14 displays guidance on the display unit 16 in cooperation with the guidance process unit 15 based on the kind of the key determined by the key code recognizing unit 13.

The guidance process unit 15 performs a guidance process and a support process.

The guidance process is for displaying function explanation, usage restriction, usage advisory, supplementary remarks, or the like on the display unit 16 in accordance with the kind of the key entered by the user. The guidance process unit 15 reads out the guidance information 171 from the storage unit 17 in accordance with the kind of the key entered by the user, and displays function explanation, usage restriction, usage advisory, supplementary remarks, or the like that accords to the kind of the key on the display unit 16.

The setting particular memory 173 stores settings made about setting particulars related to each function. For example, when taking a photo by using a camera function, the control unit 12 reads out settings about image quality, size, etc. from the setting particular memory 173, sets the image quality, the size, etc. in accordance with these settings, and takes a photo.

The support process is for preventing settings about setting particulars related to each function from conflicting with settings of other functions when the user changes the settings of the function to thereby guide the user to avoid usage restriction. When the user changes settings about setting particulars related to each function that are stored in the setting particular memory 173 of the storage unit 17, the guidance process unit 15 prevents conflicts with other functions to guide the user to avoid usage restriction. The guidance process unit 15 reads out the handling information 172 from the storage unit 17 and displays advisory matters prescribed in the handling information 172 on the display unit 16. The guidance process unit 15 also displays on the display unit 16, guidance that proposes to the user, a setting with which conflicts with other functions and usage restriction do not occur. Then, in accordance with the kind of a key that is to be entered by the user in response to the proposal of the setting, the guidance process unit 15 changes the settings about the setting particulars related to a function stored in the setting particular memory 173.

The display unit 16 includes, for example, a liquid crystal display. The display unit 16 displays function explanation, usage restriction, usage advisory, supplementary remarks, or the like that is read out by the guidance process unit 15 from the storage unit 17.

First, the guidance process will be explained with reference to the drawings.

FIG. 2A to FIG. 2D are diagrams showing examples of the guidance information 171 stored in the storage unit 17.

FIG. 2A to FIG. 2D are examples for when setting "image quality" and "size". As shown in FIG. 2C, the image quality that is selected from three parameters of fine, normal, and economy will be set. As shown in FIG. 2D, the size that is selected from three parameters of UXGA, SXGA, and VGA will be set.

The image quality "fine" and the size "UXGA" cannot be set simultaneously. Setting of the image quality "fine" is subject to usage restriction in relation to setting of the size "UXGA", and setting of the size "UXGA" is subject to usage restriction in relation to setting of the image quality "fine".

The guidance information 171 contains explanation about a function or an operation that corresponds to the content of each window that the control unit 12 displays on the display unit 16. The guidance information 171 is classified into sections "operation procedure", "categories", "function explanation", "usage restriction/advisory/supplementary remarks", and "handling". FIG. 2A to FIG. 2D show guidance information 171 for a camera function.

"Operation procedure" indicates an operation made on the key input unit 11 for changing from a standby window such as a menu window to a window that corresponds to each function. For example, "M4" indicates a window that is displayed when a Menu key is operated first and a "4" key is operated next.

"Categories" is a section that is based on the name of a function executed on each window, function explanation that explains the content of the function, and the content of usage restriction/advisory/supplementary remarks about the function. The first category indicates the name of a function executed on a window that is displayed in accordance with an operation, and shows the track of window changes corresponding to "operation procedure". The second category indicates a classification name that is based on the name of a function, the content of function explanation, and the content of usage restriction/advisory/supplementary remarks. For example, when the explanation is about general matters of camera shooting, the classification name is "general". When the explanation is about when shooting is performed, the classification name is "at the time of shooting". If a classification name is given to match the content of a function, the name is bracketed with <and>. For example, a classification name <image quality setting> is given to match the content of a function "image quality setting". The third category indicates a category that is based on the content of the second category, the content of a function to be executed, and the content of explanation. The third category indicates, for example, "hard", which means that the explanation is about hardware of the electronic apparatus, "specifications", which means that the explanation is about operations of a function or setting conditions, "setting", which means that the explanation is about settings for when the electronic apparatus is used, etc.

"Function explanation" is a brief explanation about each function. "Usage restriction/advisory/supplementary remarks" is an explanation about restrictions, advisory matters, or supplementary matters for when each function is used. "Handling" prescribes a measure for when an event occurs on each window.

For example, FIG. 2A to FIG. 2D show guidance information for when the electronic apparatus is a portable phone apparatus with a camera function. The "handling" section of FIG. 2A provides that when an incoming call event occurs while the portable phone apparatus with a camera function is used as a camera, the shooting shall be interrupted and a pop-up message that a call is received shall be displayed on the screen. As shown in the "usage restriction/advisory/ supplementary remarks" section of FIG. 2C, the image quality setting "fine" and the size setting "UXGA" cannot be set in combination. The "handling" section of FIG. 2C provides that when an event that "fine is selected" occurs on an image quality setting window in the state that "UXGA" is set, the process shall follow handling information 172 about usage restriction, which is to be described later.

Next, the operation of the guidance process performed by the guidance process unit 15 based on the guidance information 171 of FIG. 2A to FIG. 2D will be explained with reference to FIG. 3 to FIG. 5.

Figure 3A:
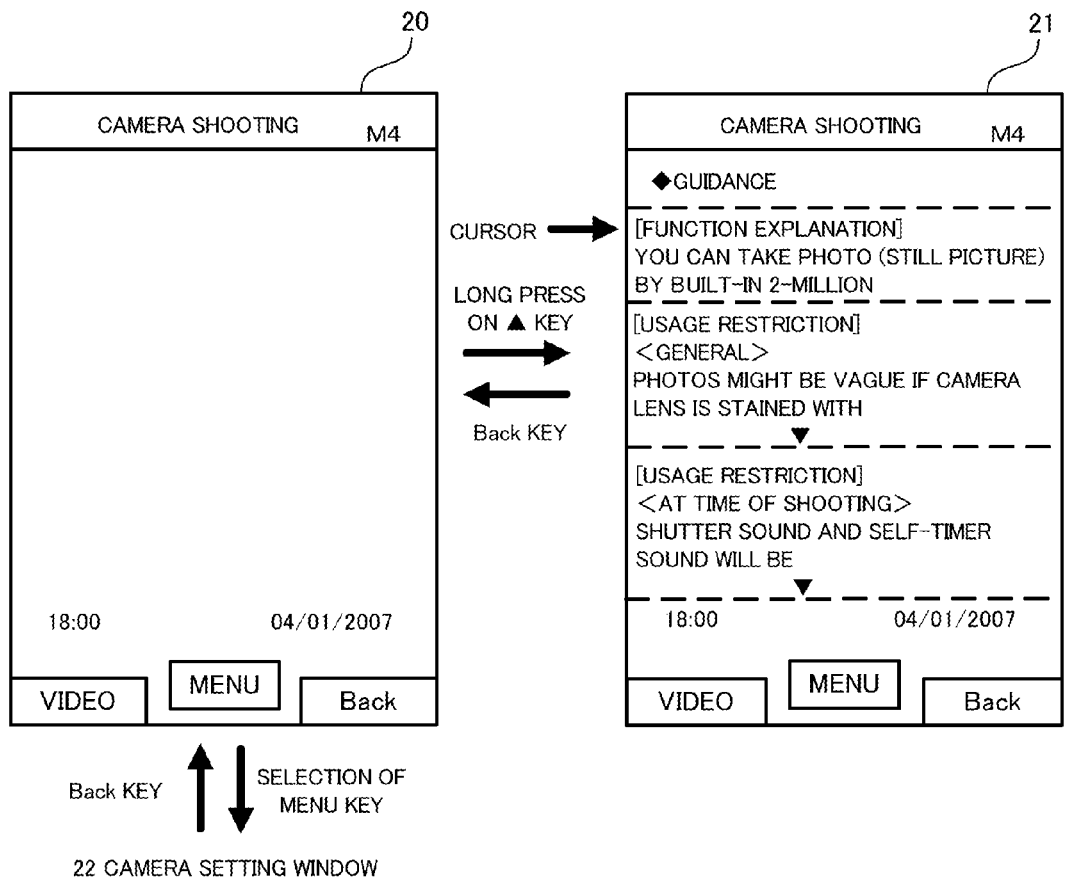
FIG. 3A is a diagram showing an example of changes of windows displayed on a display unit, and guidance displayed on each window.
Figure 3B:
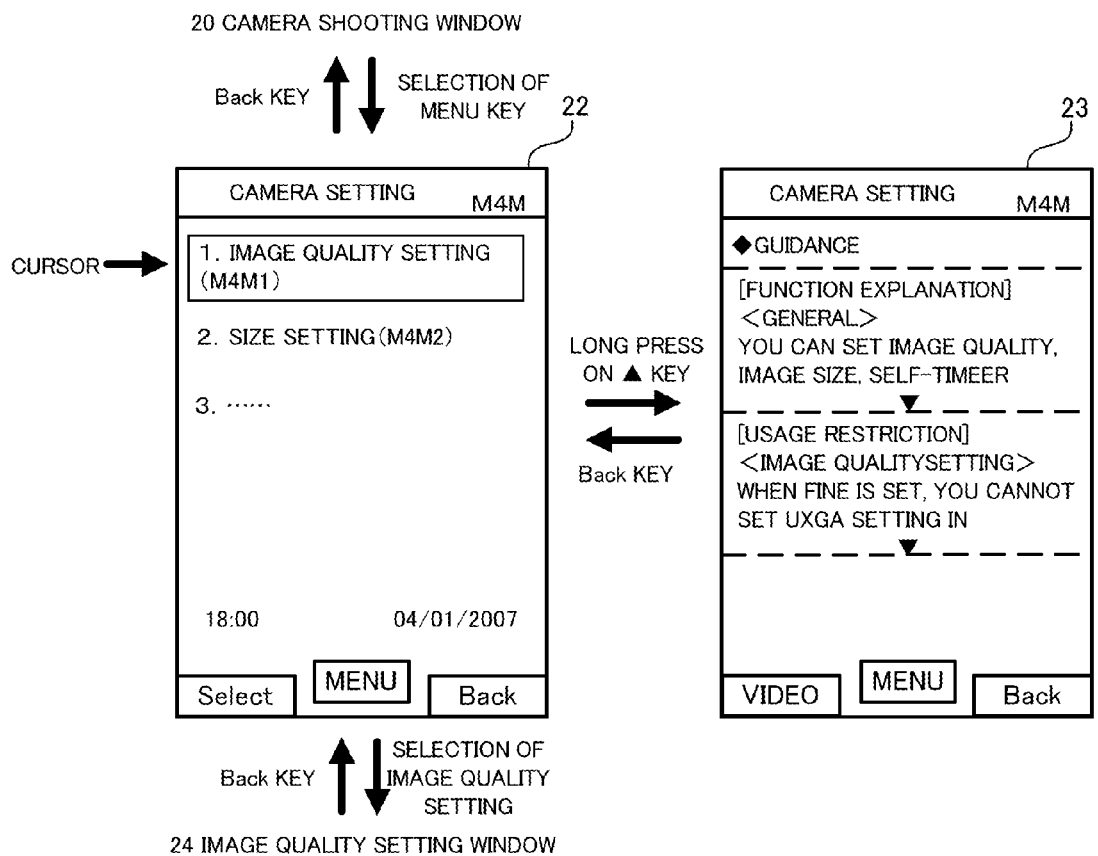
FIG. 3B is a diagram showing an example of changes of windows displayed on the display unit, and guidance displayed on each window.
Figure 3C:
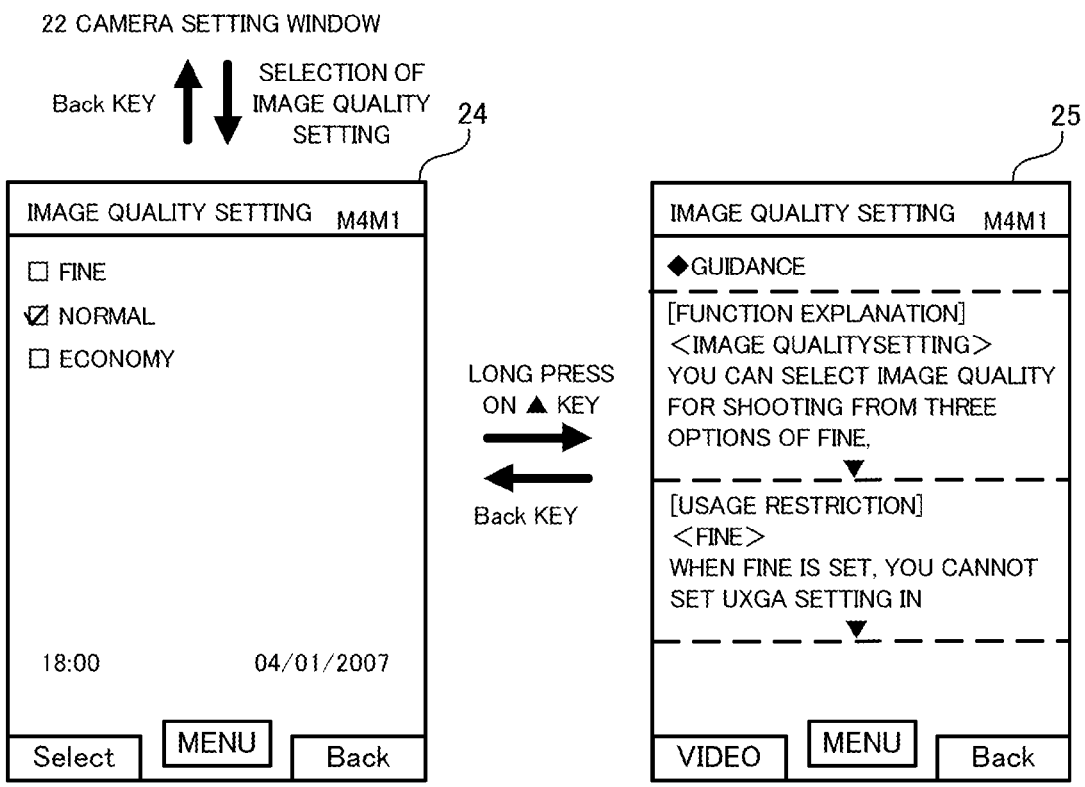
FIG. 3C is a diagram showing an example of changes of windows displayed on the display unit, and guidance displayed on each window.

FIG. 3A to FIG. 3C are diagrams showing examples of changes of windows displayed on the display unit 16 and guidance displayed on each window. FIG. 3A to FIG. 3C show changes of windows about a camera function, on the assumption that the electronic apparatus is a portable phone apparatus.

FIG. 3A shows a camera shooting window 20 and a camera shooting guidance window 21. FIG. 3B shows a camera setting window 22, which is a window for various settings related to shooting, and a camera setting guidance window 23. FIG. 3C shows an image quality setting window 24 and an image quality setting guidance window 25.

In response to a press to a specific key, the window control unit 14 changes the window for executing each function to the guidance window for that function. The window control unit 14 changes to the guidance window when, for example, a ▲ key is long-pressed.

The user activates the camera by operating the key input unit 11. For example, the camera is activated by the user giving a M4 operation, i.e., first operating the Menu key and then the "4" key. The key code recognizing unit 13 determines the kinds of the keys entered by the user and notifies the window control unit 14 that an instruction for camera activation is given. The window control unit 14 displays the camera shooting window 20, which is a window for camera shooting, on the display unit 16 as shown in FIG. 3A. "Camera shooting" displayed on this window indicates the name of the window, and "M4" indicates the kinds of the keys entered in the standby state. The window control unit 14 also displays date/time, a "video" key, a "Back" key, and a "MENU" key.

The window control unit 14 changes the window to the camera shooting guidance window 21 when the ▲ key is long-pressed in the state that the camera shooting window 20 is displayed as shown in FIG. 3A.

Upon recognizing that the ▲ key is long-pressed, the key code recognizing unit 13 determines that the ▲ key is long-pressed and notifies this to the window control unit 14. In response to that the ▲ key is long-pressed, the window control unit 14 notifies the information for identifying the currently-displayed window, i.e., "M4" to the guidance process unit 15 to instruct the guidance process unit 15 to perform the guidance process. In response to this instruction, the guidance process unit 15 performs the guidance process.

Figure 4:
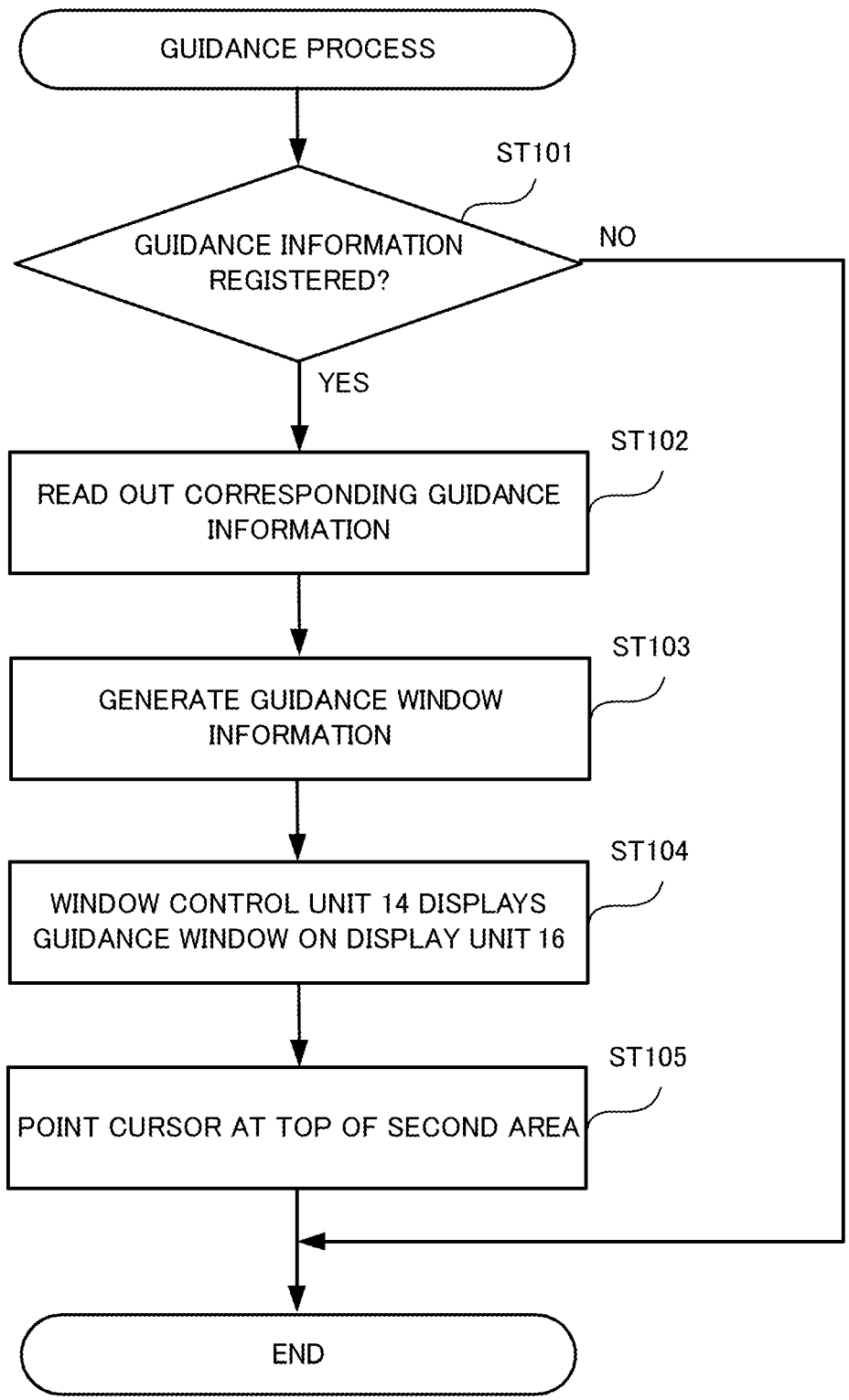
FIG. 4 is an example of a flowchart of a guidance process.
Figure 5:
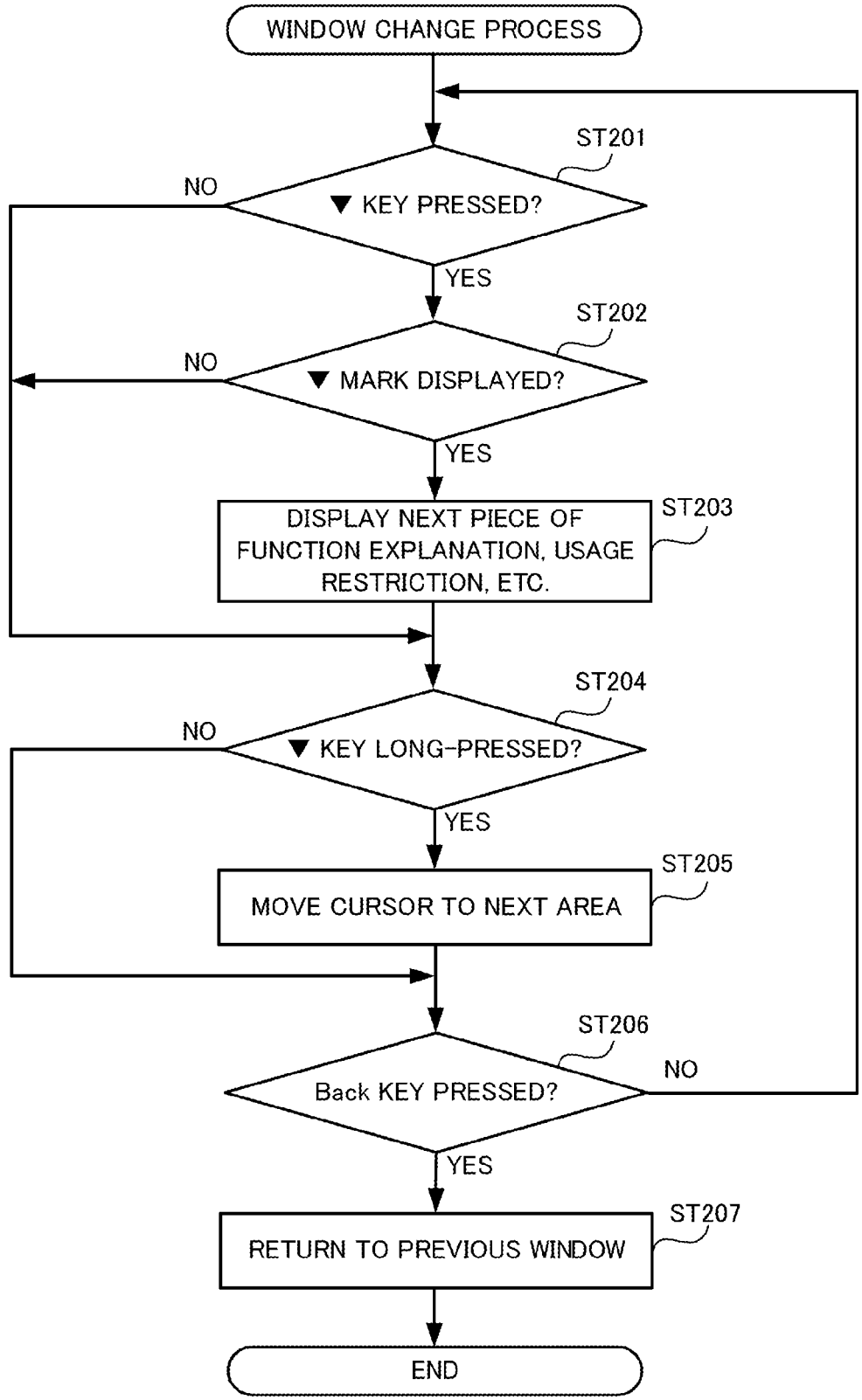
FIG. 5 is an example of a flowchart of a window change process on a camera shooting guidance window, which changes in accordance with the kind of keys.

FIG. 4 is an example flowchart of the guidance process. With reference to FIG. 4, the guidance process will be explained.

Upon receiving an instruction for the guidance process from the window control unit 14, the guidance process unit 15 first determines whether guidance information 171 corresponding to the window displayed on the display unit 16 is registered in the storage unit 17 or not (step ST101). When guidance information 171 corresponding to the current window is registered in the storage unit 17 (step ST101; YES), the guidance process unit 15 reads out the corresponding guidance information 171 (step ST102). For example, the guidance process unit 15 reads out the guidance information corresponding to the window M4 and stores it in an unillustrated buffer or the like. When no guidance information corresponding to the window displayed on the display unit 16 is stored in the storage unit 17, the guidance process unit 15 terminates the guidance process (step ST101; NO). In this case, the guidance process unit 15 may display that there is no guidance information corresponding to the window displayed on the display unit 16.

The guidance process unit 15 generates guidance window information to be displayed on the display unit 16, based on the read-out guidance information 171 (step ST103). First, the guidance process unit 15 generates letters "♦guidance", which indicates that the window concerned is a guidance window. Then, the guidance process unit 15 generates display information that is to be displayed as "function explanation". That is, the guidance process unit 15 reads out function explanation for each classification name of the second category described above from the read-out guidance information 171 corresponding to M4, arranges the content of the function explanation that is registered at the top as display information to be displayed first of all the function explanations to be displayed, and adds an indication "[function explanation]" to this function explanation. Since only one piece of function explanation is registered in the guidance information 171 of FIG. 2A, the guidance process unit 15 uses the content of this function explanation as display information to be displayed as function explanation. When two or more pieces of function explanation are registered, the guidance process unit 15 adds information that two or more pieces of "function explanation" are registered to the display information that is to be displayed as function explanation. Since only one piece of function explanation is registered in the example of FIG. 2A, the guidance process unit 15 does not add information that two or more pieces of "function explanation" are registered.

Then, the guidance process unit 15 generates display information to be displayed as "usage restriction". That is, the guidance process unit 15 reads out usage restriction/advisory/supplemental remarks for each classification name of the second category from the read-out guidance information 171 corresponding to M4, and sorts the read-out information to generate display information to be displayed as "usage restriction". The example shown in FIG. 2A includes usage restriction/advisory/supplementary remarks corresponding to the second category <general>, and usage restriction/advisory/supplementary remarks corresponding to the second category <at the time of shooting>. Therefore, the guidance process unit 15 uses usage restriction/advisory/supplementary remarks corresponding to the second category "general" as display information to be displayed as "usage restriction <general>", and usage restriction/advisory/supplementary remarks corresponding to the second category <at the time of shooting> as display information to be displayed as "usage restriction <at the time of shooting>". When two or more pieces of usage restriction/advisory/supplementary remarks are registered for each classification name of the second category, the guidance process unit 15 adds information that two or more pieces of usage restriction/advisory/supplementary remarks are registered to each display information. In the example shown in FIG. 2A, two or more pieces of usage restriction/advisory/supplementary remarks are registered for both the second category <general> and the second category <at the time of shooting>. Therefore, the guidance process unit 15 adds information that two or more pieces of usage restriction/advisory/supplementary remarks are registered.

The guidance process unit 15 notifies the generated display information pieces to the window control unit 14. The window control unit 14 displays the received display information pieces on the display unit 16 in order (step ST104). Specifically, the window control unit 14 first divides the display area of the screen into four, and displays "♦guidance" in the first area. Then, the window control unit 14 displays the first piece of "function explanation" in the second area with an indication "[function explanation]" to the extent that the second area can contain letters. The window control unit 14 may display the full text by automatically scrolling the screen so that the letters that are out of the capacity of the area may appear. Alternatively, the window control unit 14 may display the full text on the screen when the user presses a select key. The window control unit 14 may use an appropriate display manner based on the screen size, the number of letters to be displayed, etc.

When the window control unit 14 receives a notification that two or more pieces of "function explanation" are registered from the guidance process unit 15, the window control unit 14 displays a ▼ mark at the bottom of the second area. This can indicate that there are two or more pieces of function explanation. Here, the window control unit 14 does not display a ▼ mark because only one piece of function explanation is registered.

When the display of "function explanation" is completed, the window control unit 14 displays "usage restriction <general>" in the third area. Specifically, the window control unit 14 displays the display information of "usage restriction <general>" received from the guidance process unit 15 in the third area with an indication "[usage restriction] <general>" to the extent that the third area can contain letters. Since the window control unit 14 has received a notification that two or more pieces of "usage restriction <general>" are registered from the guidance process unit 15, the window control unit 14 displays a ▲ mark at the bottom of the third area.

Then, the window control unit 14 displays the display information of "usage restriction <at the time of shooting>" in the fourth area together with an indication "[usage restriction] <at the time of shooting>" to the extent that the fourth area can contain letters. Since the window control unit 14 has also received a notification that two or more pieces of display information of this kind are registered, the window control unit 14 displays a ▲ mark at the bottom of the fourth area.

Upon completing the guidance display process in the manner described above, the window control unit 14 points a cursor at the top of the second area as shown in FIG. 3A (step ST105). With these steps, the process of displaying the camera shooting guidance window 21 by the window control unit 14 and the guidance process unit 15 is completed.

Next, window change on the camera shooting guidance window 21 will be explained with reference to FIG. 5. FIG. 5 is an example flowchart of a window change process on the camera shooting guidance window 21, which changes in accordance with the kind of keys.

When determining that a ▼ key is pressed in the state that the camera shooting guidance window 21 is displayed on the display unit 16 (step ST201; YES), the key code recognizing unit 13 notifies this to the window control unit 14. In response to this notification, the window control unit 14 determines whether a ▼ mark is displayed or not on a display area at which the cursor is pointed (step ST202). When a mark is displayed (step ST202; YES), the window control unit 14 displays the next piece of function explanation or usage restriction that is to be displayed on the display area at which the cursor is pointed (step ST203). This allows the user to check all the pieces of function explanation and usage restriction about camera shooting.

When determining that a ▼ key is long-pressed in the state that the camera shooting guidance window 21 is displayed on the display unit 16 (step ST204; YES), the key code recognizing unit 13 notifies this to the window control unit 14. In response to this notification, the window control unit 14 moves from the area at which the cursor is currently pointed to the next area (step ST205). This allows the user to change categories of function explanation or usage restriction that he/she wants to check.

When determining that a key corresponding to "Back" is pressed (step ST206; YES), the key code recognizing unit 13 notifies this to the window control unit 14. In response to this notification, the window control unit 14 returns the display to the previous window (step ST207). That is, the window control unit 14 changes the camera shooting guidance window 21 to the camera shooting window 20 as shown in FIG. 3A to display the camera shooting window 20 on the display unit 16.

When the key code recognizing unit 13 determines that the Menu key is pressed in the state that the camera shooting window 20 is displayed, the window control unit 14 changes the camera shooting window 20 to the camera setting window 22. The window control unit 14 displays the camera setting window 22 on the display unit 16 as shown in FIG. 3B. Then, as a title, the window control unit 14 displays the window name "camera setting" and an operation procedure "M4M", which indicates the operation until the window is changed from the standby window such as a menu window to the camera setting window 22. The window control unit 14 also displays "1. image quality setting (M4M1)", "2. size setting (M4M2)", etc. as camera setting particulars. After displaying the camera setting window 22, the window control unit 14 points the cursor at the first one of the camera setting particulars, here "1. image quality setting (M4M1)".

When determining that the ▲ key is long-pressed in the state that the camera setting window 22 is displayed and the cursor is pointed at "1. image quality setting (M4M1)", the key code recognizing unit 13 notifies this to the window control unit 14. In response to this notification, the window control unit 14 instructs the guidance process unit 15 to perform a guidance process for displaying guidance related to the camera setting window 22. Since this guidance process is performed in substantially the same procedure as FIG. 4 described above, explanation about this guidance process will not be provided here. By the guidance process, the camera setting guidance window 23 related to the camera setting window 22 is displayed as shown in FIG. 3B. Since window change in accordance with the kind of keys entered from the camera setting guidance window 23 is also substantially the same as shown in FIG. 5, explanation about this window change will not be provided here.

When the user selects image quality setting by pressing the "Select" key in the state that the cursor is pointed at "1. image quality setting (M4M1)" on the camera setting window 22 shown in FIG. 3B, the window control unit 14 changes the display on the display unit 16 to the image quality setting window 24 shown in FIG. 3C. The window control unit 14 displays image quality options that can be set for the camera function, and a checkmark in the checkbox of the image quality option that is currently set. The example of FIG. 3C includes three image quality options of "fine", "normal", and "economy", and "normal" is currently set as the image quality.

The display on the image quality setting guidance window 25, which is a guidance window for the image quality setting window 24, and window change on the image quality setting guidance window 25 in accordance with the kind of keys entered by the user are substantially the same as in the above-described windows. Therefore, explanation about them will not be provided here.

Next, the support process will be explained with reference to the drawings.

When the user changes the settings about setting particulars related to each function stored in the setting particular memory 173, the guidance process unit 15 supports the operation of the user to let the user change the settings about setting particulars related to each function stored in the setting particular memory 173 to optimum settings that do not involve conflicts with other functions or usage restriction.

FIG. 6 is a diagram showing an example of the handling information 172 stored in the storage unit 17. The handling information 172 contains explanation about usage restriction, i.e., about parameters that cannot be set in combination, and scenario information that describes a handling scenario such as a measure for such usage restriction, etc. FIG. 6 shows usage restriction against selection of the image quality setting "fine" and the size setting "UXGA", as an example of usage restriction.

The handling information 172 contains usage restriction corresponding to each window to be displayed on the display unit 16. The handling information 172 is classified into sections "operation procedure", "setting particular", and "usage restriction". "Usage restriction" is further classified into sections "restriction target", "usage restriction explanation", "necessity determination window", "priority order", and "handling". "Operation procedure" indicates an operation made on the key input unit 11 for changing from the standby window such as a menu window to each window. "Setting particular" indicates the name of a setting particular that is subject to usage restriction. "Restriction target" indicates the name of a parameter that belongs to the setting particular indicated in the "setting particular" section and that is subject to usage restriction. "Usage restriction explanation" is an explanation about the content of usage restriction. "Necessity determination window" indicates a window on which determination whether usage restriction is necessary or not is made. A setting particular that requires necessity determination in all windows may be given an indication "ALL", and a setting particular that requires necessity determination in a plurality of windows may be additionally given an indication of the operation procedure from the standby window to each of these windows.

"Priority order" is priority information that is added when it is necessary to prioritize a given setting particular to another setting particular when setting these setting particulars. In the example of FIG. 6, when the image quality setting "fine" and the size setting "UXGA" are set simultaneously by key operations of the user, the control unit 12 effects the image quality setting "fine" preferentially. Then, to avoid usage restriction, the control unit 12 changes the size setting "UXGA" to the size setting "SXGA". For example, when the image quality setting "fine" is selected in the state that the size setting "UXGA" is set, the control unit 12 sets the image quality setting "fine" preferentially. That is, the control unit 12 accepts setting of the image quality setting "fine". In this case, the image quality setting "fine" is a priority parameter and the size setting "UXGA" is a non-priority parameter.

The control unit 12 displays the image of the size setting "UXGA" grayed out to render the size setting "UXGA" impossible to set. Then, the control unit 12 provisionally sets the size setting to "SXGA", and displays a confirmation message for this provisional setting on the display unit 16 (to be described in detail later). "Handling" describes, as a sort of handling scenario, a process performed by the guidance process unit 15 in accordance with the above-described "priority order". That is, "handling" describes setting options that do not conflict with the usage restriction, and a scenario for each option.

The support process that involves reference to the handling information 172 described above will be explained with reference to FIG. 7A to FIG. 7D and FIG. 8. FIG. 7A to FIG. 7D are diagrams that show changes of windows to be displayed for the support process, in the case of changing the image quality setting in relation to the image quality setting window 24 shown in FIG. 3C. FIG. 7A to FIG. 7D show the support process for when the user changes the image quality setting "normal" to the image quality setting "fine" on the image quality setting window 24 on which the image quality setting "normal" is set.

When the user moves the cursor by pressing the ▲ key to designate "fine" and then presses the "Select" key, the key code recognizing unit 13 determines the kinds of these keys, and notifies them to the window control unit 14. The window control unit 14 has retained the setting that has been selected up until that time, here the image quality setting "normal", and recognizes that the user has given an operation to change the image quality setting "normal" to the image quality setting "fine". Upon recognizing that the image quality setting is changed, the window control unit 14 instructs the guidance process unit 15 to perform the support process.

Figure 8:
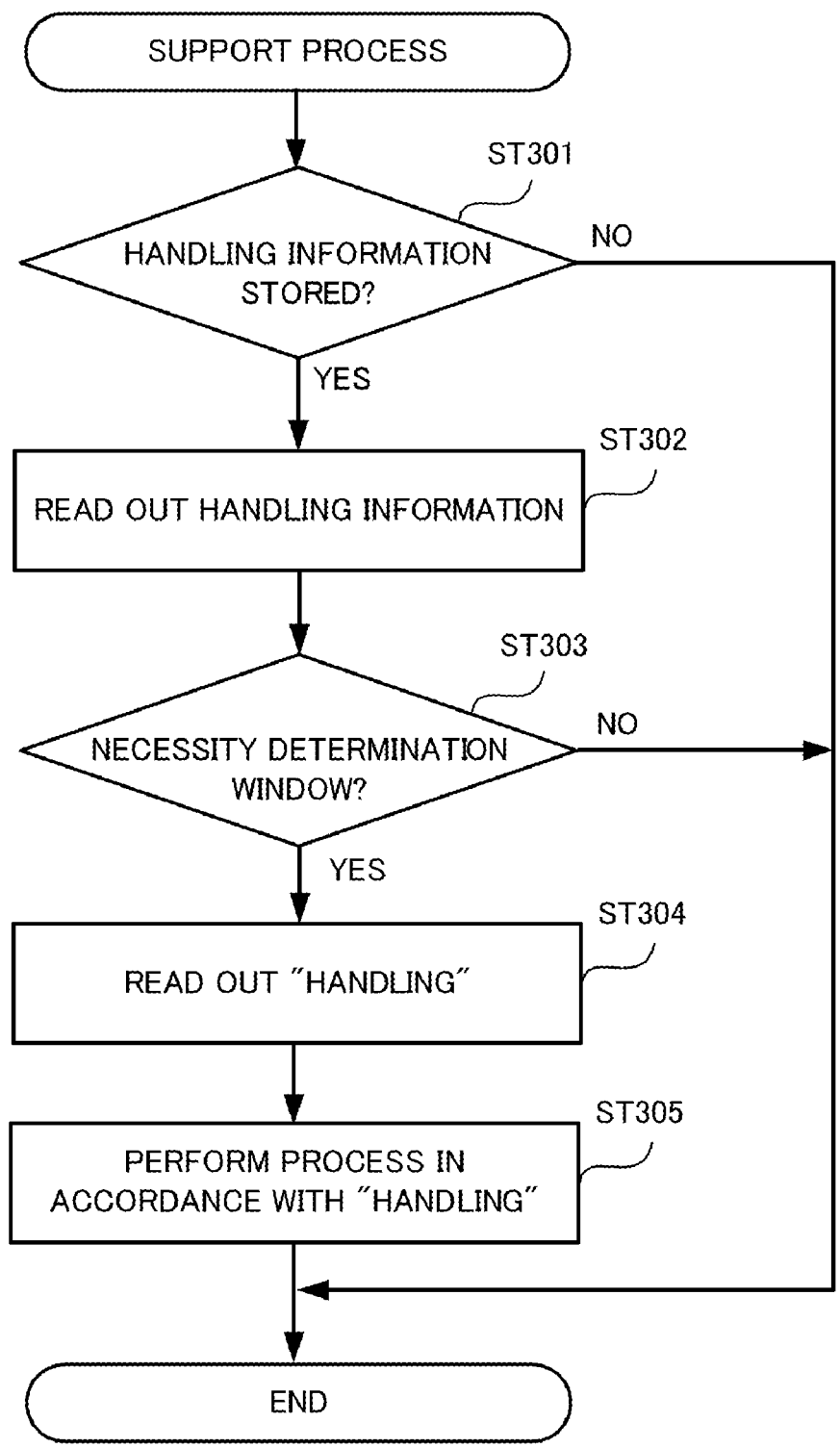
FIG. 8 is an example of a flowchart for a support process for when a user gives an operation to change a setting.

FIG. 8 is an example flowchart of the support process for when the user gives an operation to change a setting.

The guidance process unit 15 checks whether or not the storage unit 17 stores handling information 172 corresponding to the operation of the user (step ST301). That is, the guidance process unit 15 determines whether or not the parameter set by the user matches "restriction target" of any handling information 172 stored in the storage unit 17. When the parameter matches none (step ST301; NO), the guidance process unit 15 terminates the support process.

On the other hand, when the parameter matches any (step ST301; YES), the guidance process unit 15 reads out, from the storage unit 17, the handling information 172, of which "restriction target" matches the parameter set by the user (step ST302). Here, the parameter set by the user matches the restriction target "fine". Therefore, the guidance process unit 15 reads out the handling information 172 shown in FIG. 6. Then, the guidance process unit 15 determines whether or not the displayed window is the "necessity determination window" included in the handling information 172 (step ST303). Here, the displayed window "M4M1" is the necessity determination window "M4M1" included in the handling information 172 (step ST303; YES).

The guidance process unit 15 reads out, from the handling information 172, "handling" that corresponds to the function name "image quality setting" on the displayed window and the restriction target "fine" (step ST304), and performs the process in accordance with the content of "handling" (step ST305). Since the image quality setting "fine" is selected here, the guidance process unit 15 reads out a content "display that 'the size UXGA cannot be set. Do you change the setting? [YES] or [NO]'", and outputs the read-out content to the window control unit 14. The window control unit 14 divides the display area of the display unit 16 into an image quality setting display area 30a and a support display area 30b as shown in an image quality setting support process window 30 of FIG. 7B. Then, the window control unit 14 displays "fine" that is check-marked in the image quality setting display area 30a, and the content received from the guidance process unit 15 that "the size UXGA cannot be set. Do you change the setting? [YES] or [NO]" in the support management display area 30b.

When the user presses a key corresponding to "NO" in the state that the image quality setting support process window 30 is displayed, the key code recognizing unit 13 determines the kind of the key and notifies the window control unit 14 that the key corresponding to "NO" is pressed. The window control unit 14 notifies the guidance process unit 15 that "NO" is selected. The guidance process unit 15 instructs the window control unit 14 to change to the window before "fine" is set, based on the content of "handling" for when "NO" is selected, i.e., based on a "process for when [NO] is selected: automatically change to the window before the image quality setting 'fine' is set". That is, the guidance process unit 15 instructs the window control unit 14 to return the display to the image quality setting window 24. The window control unit 14 displays the image quality setting window 24 on the display unit 16.

On the other hand, when the user presses a key corresponding to "YES", the key code recognizing unit 13 determines the kind of the key and notifies the window control unit 14 that the key corresponding to "YES" is pressed. The window control unit 14 notifies the guidance process unit 15 that "YES" is selected. The guidance process unit 15 performs the process in accordance with the content of "handling" for when "YES" is selected. That is, the guidance process unit 15 instructs the window control unit 14 to perform a "process for when [YES] is selected", which includes "graying out the display of the size setting 'UXGA'", "when the size setting 'UXGA' is selected, changing the size setting to 'SXGA'", and "displaying that 'UXGA is grayed out because UXGA cannot be selected when the image quality 'fine' is selected. SXGA is provisionally set. Do you agree? [YES] or [NO]'".

Figure 7A:
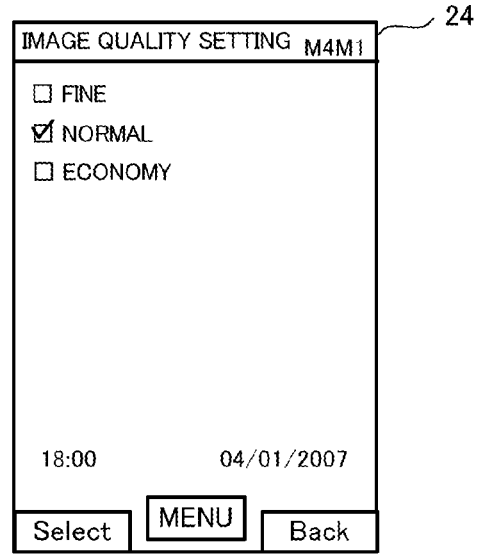
FIG. 7A is a diagram showing changes of windows to be displayed for a support process for when an image quality setting is changed in relation to an image quality setting window.
Figure 7B:
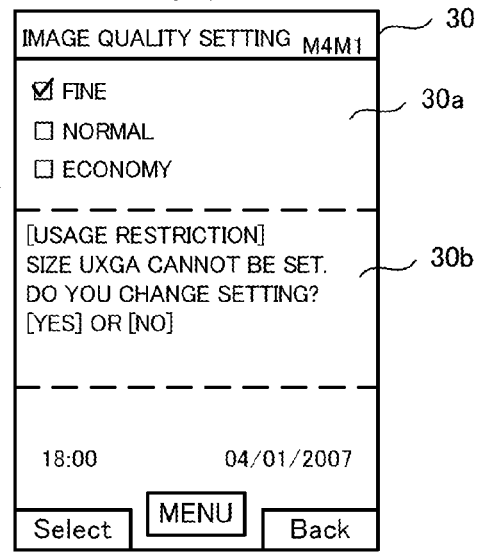
FIG. 7B is a diagram showing changes of windows to be displayed for the support process for when an image quality setting is changed in relation to an image quality setting window.
Figure 7C:
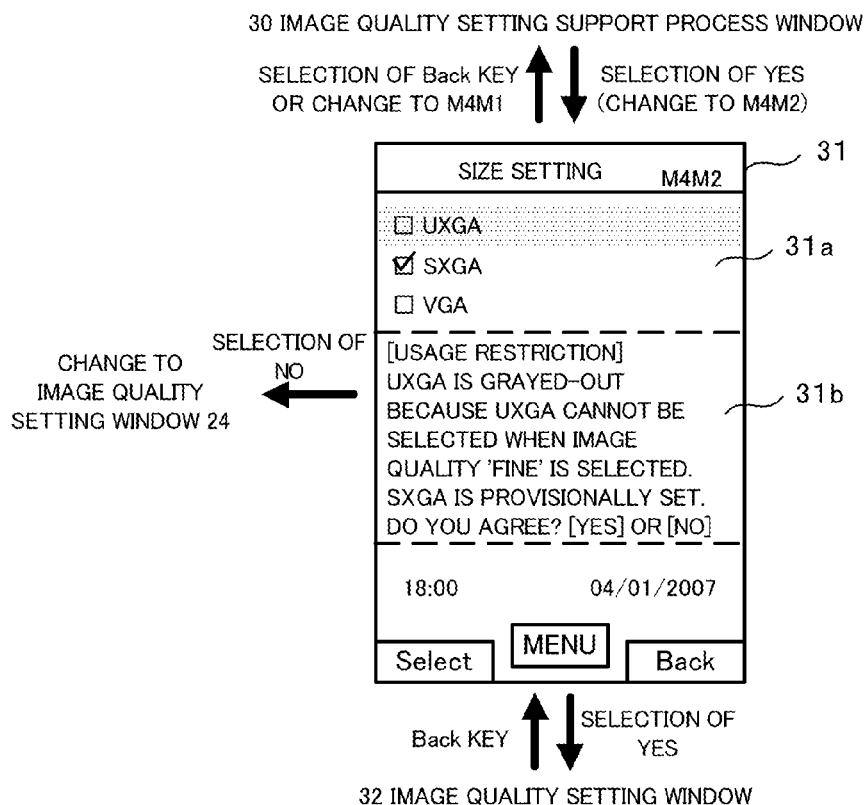
FIG. 7C is a diagram showing changes of windows to be displayed for the support process for when an image quality setting is changed in relation to an image quality setting window.
Figure 7D:
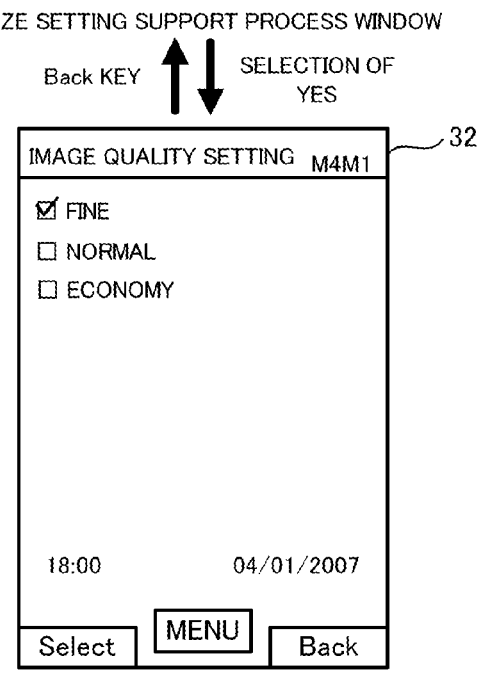
FIG. 7D is a diagram showing changes of windows to be displayed for the support process for when an image quality setting is changed in relation to an image quality setting window.

The window control unit 14 divides the display area of the display unit 16 into a size setting display area 31a and a support management display area 31b, as shown in FIG. 7C. Then, the window control unit 14 displays "UXGA" that is grayed out, "SXGA" that is check-marked, and "VGA" in the size setting display area 31a. Then, the window control unit 14 displays the content received from the guidance process unit 15 that "UXGA is grayed out because UXGA cannot be selected when the image quality 'fine' is selected. SXGA is provisionally set. Do you agree? [YES] or [NO]" in the support management display area 30b.

When the user presses a key corresponding to "NO" in the state that a size setting support process window 31 is displayed, the key code recognizing unit 13 determines the kind of the key and notifies the window control unit 14 that the key corresponding to "NO" is pressed. The window control unit 14 notifies the guidance process unit 15 that "NO" is selected. The guidance process unit 15 performs the process in accordance with the content of "handling" for when "NO" is selected, i.e., "when [NO] is selected, automatically change to the image quality setting window before "fine" is set". That is, the guidance process unit 15 instructs the window control unit 14 to return the display to the image quality setting window 24 shown in FIG. 7A. The window control unit 14 displays the image quality window 24 on the display unit 16.

On the other hand, when the user presses a key corresponding to "YES", the guidance process unit 15 performs the process in accordance with the content of "handling" for when "YES" is selected, i.e., "when [YES] is selected, register data about the settings and automatically change to an image quality setting window on which 'fine' is set". Then, the guidance process unit 15 updates the settings of the parameters about the image quality setting and size setting in the setting particular memory 173 in the storage unit 17 to the image quality "fine" and the size "SXGA" respectively. Then, the display is changed to an image quality setting window 32 shown in FIG. 7D, on which "fine" is selected, and the support process related to setting of "fine" is completed.

As described above, in the embodiment described above, the guidance process unit 15 reads out corresponding guidance information 171 in accordance with a press of a specific key, and the window control unit 14 displays the information on the display unit 16. In accordance with the present invention, explanation about a user's desired content that is of an instruction manual level is displayed window by window. Therefore, even without an instruction manual, it is easy for the user to fully utilize each function that is mounted or implemented on the electronic apparatus, by checking the display on each window.

In the embodiment described above, when the user sets a setting particular that includes a parameter that might be put under usage restriction as conflicting with other functions, the guidance process unit 15 reads out handling information 172, and the window control unit 14 displays guidance on the display unit 16. In accordance with the present invention, it is possible to guide the user to appropriately set a setting particular that has setting restriction. That is, the user can make all the settings related to such a function simultaneously by giving operations in accordance with the guidance. Therefore, it is no longer necessary for the user to make relevant settings one by one by consulting an instruction manual and paying attention to avoid conflicts between functions. Accordingly, the present invention can give excellent operability to even an electronic apparatus that has multiple functions and is complicated to operate.

In the embodiment described above, the key code recognizing unit 13, the window control unit 14, and the guidance process unit 15 are realized by a program executed by the control unit 12. However, the key code recognizing unit 13, the window control unit 14, and the guidance process unit 15 may be realized by hardware.

In the embodiment described above, a portable phone apparatus has been explained as the electronic apparatus. Not being limited to this, the present invention may be applied to portable apparatuses such as a Personal Handyphone System (PHS), a Personal Data Assistance or Personal Digital Assistants (PDA), etc. Not being limited to portable apparatuses, the present invention may be applied to electronic apparatuses such as a personal computer, a digital camera, a FAX machine, etc.

Figure 9:
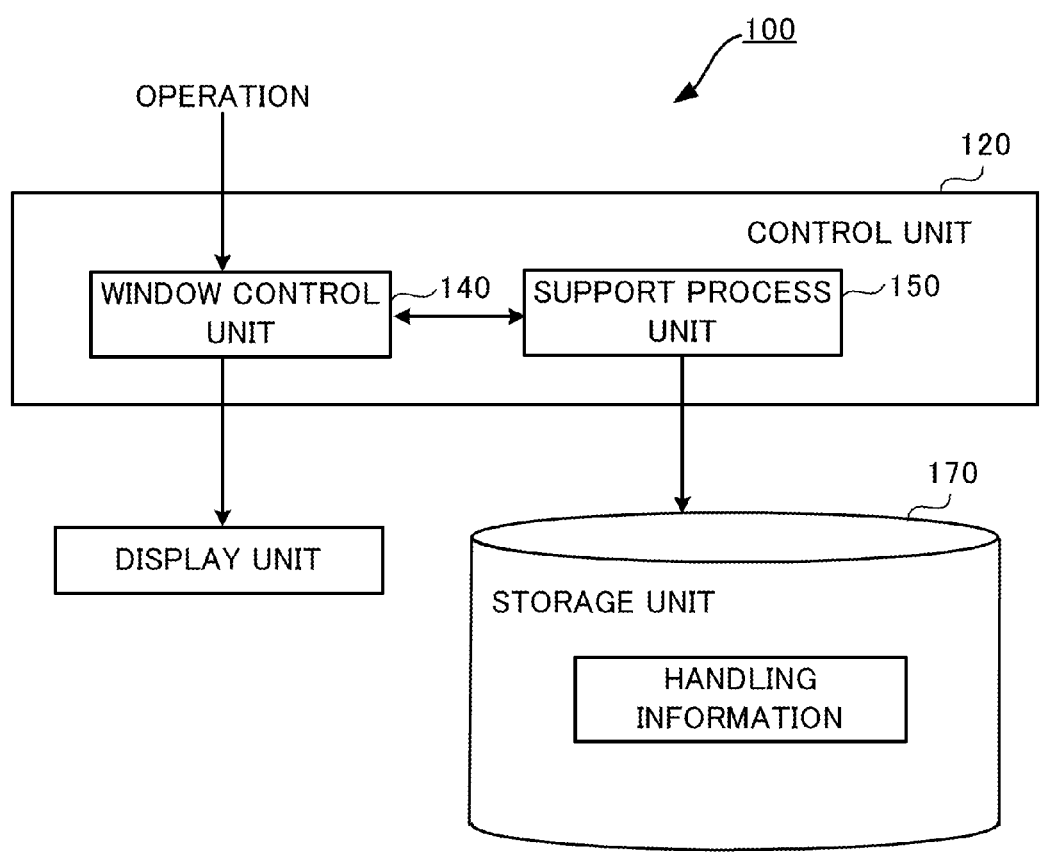
FIG. 9 is a block diagram showing an example of an electronic apparatus according to another embodiment of the present invention.

Furthermore, the present invention may be applied to any electronic apparatus that includes a display unit that displays guidance about an operation to make settings to functions provided on the apparatus and to setting particulars related to the functions. For example, FIG. 9 is a block diagram showing an example electronic apparatus according to another embodiment of the present invention. The electronic apparatus 100 includes at least a storage unit 170, a window control unit 140, and a support process unit 150. For each setting particular to be put under usage restriction for preventing conflicts between a given function and other functions, the storage unit 170 stores handling information that contains information for handling the usage restriction. When an operation to set a parameter that belongs to a setting particular subject to usage restriction is entered, the support process unit 150 reads out information, included in the handling information, for handling the usage restriction related to the setting particular from the storage unit 170, and outputs the read-out information to the window control unit 140. The window control unit 140 displays the received handling information on the display unit 16.

The embodiments of the present invention having been explained, it should be understood that various modifications or combinations that might become necessary due to design expediency or other factors are included in the scope of the invention set forth in the claims or the scope of the invention corresponding to the examples in the description.

The present application is based on Japanese Patent Application No. 2007-182970 filed on Jul. 12, 2007, of which specification, claims, and drawings are incorporated herein by reference in their entirety.

INDUSTRIAL APPLICABILITY

The present invention can be applied to portable apparatuses such as a portable phone apparatus, a PHS, a PDA, etc., and to electronic apparatuses such as a personal computer, a digital camera, a FAX machine, etc.

The invention claimed is:

1. An electronic apparatus having a plurality of functions, comprising:
 a setting request detecting unit that detects that a request for setting a parameter about a setting particular related to each of the functions is given;
 a handling information storing unit that stores handling information for handling a status where setting of a parameter is impossible, for each setting particular that has a parameter that impossible to set in relation to another setting particular; and
 a handling information processing unit that, in response to that the setting request detecting unit detects a request for setting a parameter, determines whether setting of the parameter is possible or not, and in a case where setting of the parameter is impossible, outputs the handling information for handling the status where setting is impossible.

2. The electronic apparatus according to claim 1,
wherein the handling information contains scenario information that describes a scenario for handling the status where setting is impossible, and
the handling information processing unit outputs the handling information in accordance with the scenario information.

3. The electronic apparatus according to claim 2,
wherein the handling information contains selection information for letting a parameter with which the status where setting is impossible can be avoided be selected, and
in the case where setting of the parameter is impossible, the handling information processing unit outputs the selection information, and in response to that the setting request detecting unit detects a request for setting the parameter corresponding to the output selection information, handles the status where setting is impossible in accordance with the request for setting the parameter corresponding to the selection information.

4. The electronic apparatus according to claim 3,
wherein the handling information contains information that indicates a priority parameter that is set preferentially, and a non-priority parameter that is changed to a different parameter to avoid the status where setting is impossible,
the selection information contains preferential selection information for letting the priority parameter be selected, and
the handling information processing unit outputs the preferential selection information, and in response to that the setting request detecting unit detects a request for setting the priority parameter corresponding to the output preferential selection information, sets the priority parameter and changes the non-priority parameter to a different parameter.

5. The electronic apparatus according to claim 4,
wherein in response to that the setting request detecting unit detects the request for setting the priority parameter, the handling information processing unit renders the non-priority parameter impossible to set.

6. The electronic apparatus according to claim 1, comprising:
guidance information storing unit that stores guidance information that explains each of the functions and each of the setting particulars;
guidance request detecting unit that detects a guidance request for requesting guidance; and
guidance outputting unit that, in response to that the guidance request detecting unit detects a guidance request, outputs the guidance information that corresponds to that guidance request.

7. An information output method of an electronic apparatus that has a plurality of functions, the method comprising:
a handling information storing step of storing handling information for handling a status where setting of a parameter is impossible, for each setting particular that is related to any of the functions and that has a parameter that is impossible to set in relation to a setting particular related to any other of the functions;
a setting request detecting step of detecting that a request for setting a parameter about a setting particular related to any of the functions is given; and a handling information processing step of, in response to that a request for setting a parameter is detected at the setting request detecting step, determining whether setting of the parameter is possible or not, and in a case where setting of the parameter is impossible, outputting the handling the status where setting is impossible.

8. The information output method according to claim 7,
wherein the handling information contains scenario information that describes a scenario for handling the status where setting is impossible, and
at the handling information processing step, the handling information is output in accordance with the scenario information.

9. The information output method according to claim 8,
wherein the handling information contains selection information for letting a parameter with which the status where setting is impossible can be avoided be selected, and
at the handling information processing step, in the case where setting of the parameter is impossible, the selection information is output, and in response to that a request for setting the parameter corresponding to the output selection information is detected at the setting request detecting step, the status where setting is impossible is handled in accordance with the request for setting the parameter corresponding to the selection information.

10. The information output method according to claim 9,
wherein the handling information contains information that indicates a priority parameter that is set preferentially, and a non-priority parameter that is changed to a different parameter to avoid the status where setting is impossible,
the selection information contains preferential selection information for letting the priority parameter be selected, and
at the handling information processing step, the preferential selection information is output, and in response to that a request for setting the priority parameter corresponding to the output preferential selection information is detected at the setting request detecting step, the priority parameter is set and the non-priority parameter is changed to a different parameter.

11. The information output method according to claim 10,
wherein at the handling information processing step, in response to that the request for setting the priority parameter is detected at the setting request detecting step, the non-priority parameter is rendered impossible to set.

12. The information output method according to claim 7, comprising:
a guidance information storing step of storing guidance information that explains each of the functions and each of the setting particulars;
a guidance request detecting step of detecting a guidance request for requesting guidance; and
a guidance information outputting step of, in response to that a guidance request is detected at the guidance request detecting step, outputting the guidance information corresponding to the guidance request.

13. A program that controls a computer having a plurality of functions to perform:
a handling information storing procedure of storing handling information for handling a status where setting of a parameter is impossible, for each setting particular that is related to any of the functions and that has a parameter that is impossible to set in relation to a setting particular related to any other of the functions;

a setting request detecting procedure of detecting that a request for setting a parameter about a setting particular related to any of the functions is given; and a handling information processing procedure of, in response to that a request for setting a parameter is detected in the setting request detecting procedure, determining whether setting of the parameter is possible or not, and in a case where setting of the parameter is impossible, outputting the handling information for handling the status where setting is impossible.

14. The program according to claim 13,
wherein the handling information contains scenario information that describes a scenario for handling the status where setting is impossible, and in the handling information processing procedure, the handling information is output in accordance with the scenario information.

15. The program according to claim 14,
wherein the handling information contains selection information for letting a parameter with which the status where setting is impossible can be avoided be selected, and in the handling information processing procedure, in the case where setting of the parameter is impossible, the selection information is output, and in response to that a request for setting the parameter corresponding to the output selection information is detected in the setting request detecting procedure, the status where setting is impossible is handled in accordance with the request for setting the parameter corresponding to the selection information.

16. The program according to claim 15,
wherein the handling information contains information that indicates a priority parameter that is set preferentially, and a non-priority parameter that is changed to a different parameter to avoid the status where setting is impossible, the selection information contains preferential selection information for letting the priority parameter be selected, and in the handling information processing procedure, the preferential selection information is output, and in response to that a request for setting the priority parameter corresponding to the output preferential selection information is detected in the setting request detecting procedure, the priority parameter is set and the non-priority parameter is changed to a different parameter.

17. The program according to claim 16,
wherein in the handling information processing procedure, in response to that the request for setting the priority parameter is detected in the setting request detecting procedure, the non-priority parameter is rendered impossible to set.

18. The program according to claim 13, comprising:

a guidance information storing procedure of storing guidance information that explains each of the functions and each of the setting particulars;

a guidance request detecting procedure of detecting a guidance request for requesting guidance; and a guidance information outputting procedure of, in response to that a guidance request is detected in the guidance request detecting procedure, outputting the guidance information corresponding to the guidance request.

* * * * *